United States Patent
Hill et al.

(10) Patent No.: US 9,328,822 B2
(45) Date of Patent: May 3, 2016

(54) PARKING BRAKE SYSTEM FOR A WORK VEHICLE

(71) Applicant: CNH Industrial America, LLC, New Holland, PA (US)

(72) Inventors: Christopher Hill, Chicago, IL (US); Michael Tyler, Bolingbrook, IL (US); William H. Adamson, Naperville, IL (US); Jerry L. Brinkley, Woodridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 62 days.

(21) Appl. No.: 14/473,179

(22) Filed: Aug. 29, 2014

(65) Prior Publication Data

US 2016/0061325 A1 Mar. 3, 2016

(51) Int. Cl.
*B60T 1/00* (2006.01)
*F16H 63/34* (2006.01)

(52) U.S. Cl.
CPC ............ *F16H 63/3483* (2013.01); *B60T 1/005* (2013.01); *F16H 63/3491* (2013.01)

(58) Field of Classification Search
CPC . F16H 63/3483; F16H 63/3491; B60T 1/005; B60T 7/104; B60K 41/26; B60K 41/267
See application file for complete search history.

(56) References Cited

U.S. PATENT DOCUMENTS

| | | | |
|---|---|---|---|
| 3,800,901 A | 4/1974 | Blomstrom et al. | |
| 3,972,398 A | 8/1976 | Chamberlain | |
| 3,999,075 A | 12/1976 | Johnson et al. | |
| 4,020,932 A | 5/1977 | Windish | |
| 4,119,355 A | 10/1978 | Kreitner | |
| 4,245,724 A | 1/1981 | Beck | |
| 4,307,917 A | 12/1981 | Hasselbacher et al. | |
| 4,451,095 A | 5/1984 | Chichester et al. | |
| 5,203,616 A | 4/1993 | Johnson | |
| 6,168,244 B1 | 1/2001 | Maske | |
| 6,170,922 B1 | 1/2001 | Vannorsdel et al. | |
| 6,550,589 B1 | 4/2003 | Pomponio, Sr. | |
| 6,581,738 B2 | 6/2003 | Schafer et al. | |
| 6,715,590 B2 | 4/2004 | Tabor | |
| 6,823,976 B2 * | 11/2004 | Schmid | B60T 1/005 188/31 |
| 6,872,165 B2 | 3/2005 | Gierer | |
| 7,014,028 B2 | 3/2006 | Buck et al. | |
| 7,650,978 B2 * | 1/2010 | Ruhringer | F15B 15/261 188/265 |
| 8,161,837 B2 | 4/2012 | Giefer et al. | |
| 8,262,173 B2 | 9/2012 | Crawford | |
| 8,763,764 B2 * | 7/2014 | Jang | B60T 17/221 188/300 |
| 9,145,113 B2 * | 9/2015 | Landino | B60T 1/005 |
| 2014/0123799 A1 * | 5/2014 | Landino | B60T 1/062 74/473.11 |

* cited by examiner

*Primary Examiner* — Robert Hodge
*Assistant Examiner* — Tinh Dang
(74) *Attorney, Agent, or Firm* — Sue C. Watson (57) ABSTRACT

A parking brake system for a work vehicle may include an internal braking mechanism and an external brake actuator. The brake actuator may generally include a housing at least partially defining a rod-side chamber, a secondary chamber and a piston-side chamber extending between the rod-side and secondary chambers. The brake actuator may also include a primary piston movable between a first position at which the braking mechanism is actuated to an engaged state and a second position at which the braking mechanism is actuated to a disengaged state. In addition, the brake actuator may include a secondary piston at least partially housed within the secondary chamber that is configured to apply a force against the primary piston when fluid is supplied within the secondary chamber in order to move the primary piston from the first position to the second position.

18 Claims, 7 Drawing Sheets

PARKING BRAKE SYSTEM FOR A WORK VEHICLE

FIELD OF THE INVENTION

The present subject matter relates generally to work vehicles and, more particularly, to an improved parking brake system suitable for use with a transmission of a work vehicle.

BACKGROUND OF THE INVENTION

Typically, work vehicles, such as tractors and other agricultural vehicles, have a continuously variable transmission (CVT) or a power shift transmission (PST). Conventionally, each type of transmission utilizes a parking brake in order to maintain the vehicle in a parked or stopped condition when the vehicle is placed in park or when performing a hill holding operation. In addition, the parking brake may also be used to reduce the speed of the work vehicle, such as when the work vehicle experiences a loss of functionality (e.g., loss of electrical power and/or hydraulic pressure) that requires the vehicle to be stopped immediately.

In many instances, conventional parking brakes for work vehicle transmissions are configured to be engaged and disengaged via an electric actuator (e.g., a solenoid activated actuator). In particular, the electric actuator is typically configured to apply a linear force through a cable extending between the actuator and a corresponding lever arm, which is, in turn, rotatably coupled to the parking brake. By providing a tensioning force on the cable, the electric actuator causes the lever arm to rotate, thereby engaging the parking brake. Similarly, by releasing the tensioning force on the cable, a spring coupled directly to the lever arm may cause the lever arm to rotate in the opposite direction, thereby disengaged the parking brake.

Unfortunately, several disadvantages are typically associated with the use of electric actuators for engaging and disengaging parking brakes. Specifically, the electric actuators typically present mounting challenges within the work vehicle, since the actuator is often mounted at a location that is significantly spaced apart from the transmission. In addition, operation of an electric actuator requires the use of complex computer logic to ensure that the associated parking brake is engaged and disengaged at the appropriate time. However, even despite the use of complex computer logic, system faults (e.g., short circuits, etc.) may often result in the electric actuator being unintentionally commanded to engage the parking brake, which can cause significant damage to the brake itself or to the transmission as a whole when the vehicle is still in motion.

Accordingly, an improved parking brake system that provides an alternative to the use of electric actuators would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a parking brake system for use with a transmission of a work vehicle. The system may generally include a braking mechanism housed within the transmission and a brake actuator positioned outside the transmission. The brake actuator may be coupled to the braking mechanism to allow the braking mechanism to be actuated between an engaged state and a disengaged state. The brake actuator may generally include a housing extending between a first end and a second end. The housing may at least partially define a rod-side chamber, a secondary chamber and a piston-side chamber extending between the rod-side and secondary chambers. The brake actuator may also include a primary piston positioned within the housing between the piston-side and rod-side chambers. The primary piston may be movable between a first position at which the braking mechanism is actuated to the engaged state and a second position at which the braking mechanism is actuated to the disengaged state. In addition, the brake actuator may include a rod extending partially within the rod-side chamber. The rod may include an internal end coupled to the primary piston and an external end positioned outside the housing. Moreover, the brake actuator may include a spring housed within the rod-side chamber so as to be engaged between the piston and the first end of the housing and a secondary piston at least partially housed within the secondary chamber. The secondary piston may extend between a proximal end positioned at or adjacent to the primary piston and a distal end positioned opposite the proximal end. The secondary piston may be configured to apply a force against the primary piston when fluid is supplied within the secondary chamber at the distal end of the secondary piston in order to move the primary piston from the first position to the second position.

In another aspect, the present subject matter is directed to parking brake system for use with a transmission of a work vehicle. The system may generally include a braking mechanism housed within the transmission and a brake actuator positioned outside the transmission. The brake actuator may be coupled to the braking mechanism to allow the braking mechanism to be actuated between an engaged state and a disengaged state. The brake actuator may generally include a housing extending between a first end and a second end. The housing may at least partially define a rod-side chamber and a piston-side chamber. The brake actuator may also include a primary piston positioned within the housing between the piston-side and rod-side chambers. The primary piston may be movable between a first position at which the braking mechanism is actuated to the engaged state and a second position at which the braking mechanism is actuated to the disengaged state. In addition, the brake actuator may include a rod extending partially within the rod-side chamber. The rod may include an internal end coupled to the primary piston and an external end positioned outside the housing. Moreover, the brake actuator may include a spring housed within the rod-side chamber so as to be engaged between the piston and the first end of the housing, a return port defined within or extending from the housing and a fluid vent in flow communication between the rod-side chamber and the return port. In such an embodiment, any fluid contained within the rod-side chamber may be evacuated therefrom via the fluid vent and may subsequently be expelled from the brake actuator through the return port.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a parking brake system for used with a transmission of a work vehicle. Specifically, the system may include an internal braking mechanism housed within the transmission that serves as the vehicle's parking brake and an external brake actuator located outside the transmission. In several embodiments, the external brake actuator may correspond to a spring-applied, hydraulic release cylinder that includes a piston rod coupled to the braking mechanism (e.g., via a suitable lever arm) such that retraction/extension of the piston rod results in actuation of the internal braking mechanism between an engaged and disengaged state. For example, a spring housed within the brake actuator may be configured to apply a biasing force against a primary piston of the actuator so that the piston is pushed in a direction that results in retraction of the associated piston rod within the brake actuator, thereby engaging the braking mechanism. Additionally, to disengage the parking brake under normal operating conditions, a valve associated with the brake actuator may be controlled in a manner so as to provide pressurized hydraulic fluid within the actuator, thereby pushing the primary piston outwardly and compressing the spring. Such movement of the piston results in the piston rod being pushed outwardly from the brake actuator, which, in turn, causes the braking mechanism to be disengaged.

Additionally, in several embodiments, the brake actuator may include a secondary piston that allows for the parking brake to be disengaged when the work vehicle is disabled (e.g., when the vehicle is not operating properly and needs to be towed) and/or when the brake actuator is not otherwise functioning so as to allow the parking brake to be disengaged solely via actuation of the primary piston. Specifically, the secondary piston may be housed within a secondary chamber defined within the brake actuator at a location directly adjacent to the primary piston. By supplying pressurized fluid within the back-end of the secondary chamber, the secondary piston may be actuated against the primary piston so as to push the piston in a manner that compresses the spring and extends the piston rod outwardly from the brake actuator, thereby disengaging the braking mechanism. Thereafter, to re-engage the parking brake, the fluid may be removed from the back-end of the secondary chamber to allow the spring to push the piston backwards, thereby retracting the piston rod.

In several embodiments, fluid may be supplied to the secondary chamber by a separate fluid source than the fluid source used to supply fluid to the brake actuator during normal operation. For instance, in a particular embodiment, a handheld, manually operated grease gun may be connected to a secondary port defined through the housing of the brake actuator to allow grease to be pumped into and/or removed from the secondary chamber. In such an embodiment, a suitable fluid coupling (e.g., a hose) may be coupled to the secondary port and may extend to a convenient location on or within the work vehicle (e.g., within the cab). As a result, the operator may simply connect the grease gun to the fluid coupling and thereafter manipulate the grease gun to allow the parking brake to be engaged and disengaged manually.

Moreover, in several embodiments, the brake actuator may include a fluid vent for expelling fluid contained within the rod/spring-side chamber of the brake actuator. For example, due to leaking around the piston, hydraulic fluid used to actuate the piston along the piston-side chamber of the brake actuator may flow into the rod/spring-side chamber. In such instance, any fluid that has accumulated within the rod/spring-side chamber may be evacuated therefrom via the fluid vent and subsequently returned to the original fluid source (e.g., the vehicle's hydraulic tank).

Figure 1:
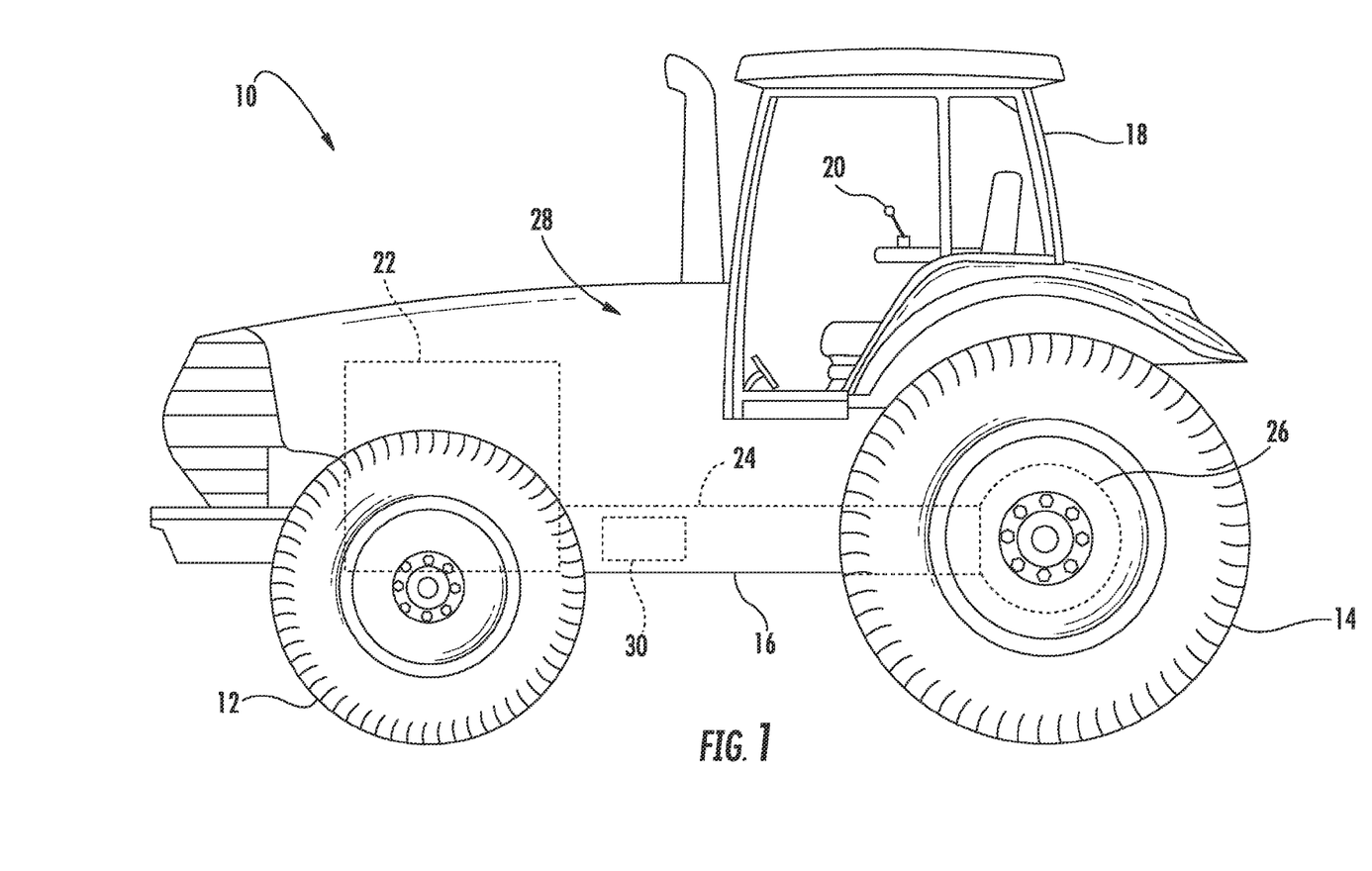
FIG. 1 illustrates a side view of one embodiment of a work vehicle.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, road vehicles, loaders and/or the like.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control devices 20 (e.g., levers, pedals, control panels and/or the like) for permitting an operator to control the operation of the work vehicle 10. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via a differential 26. The engine 22, transmission 24, and differential 26 may collectively define a drive train 28 of the work vehicle 10. Moreover, the work vehicle 10 may also include a parking brake 30 associated with the transmission 24. As will be described below, the parking brake 30 may generally have any suitable configuration that allows it to function as described herein.

Figure 2:
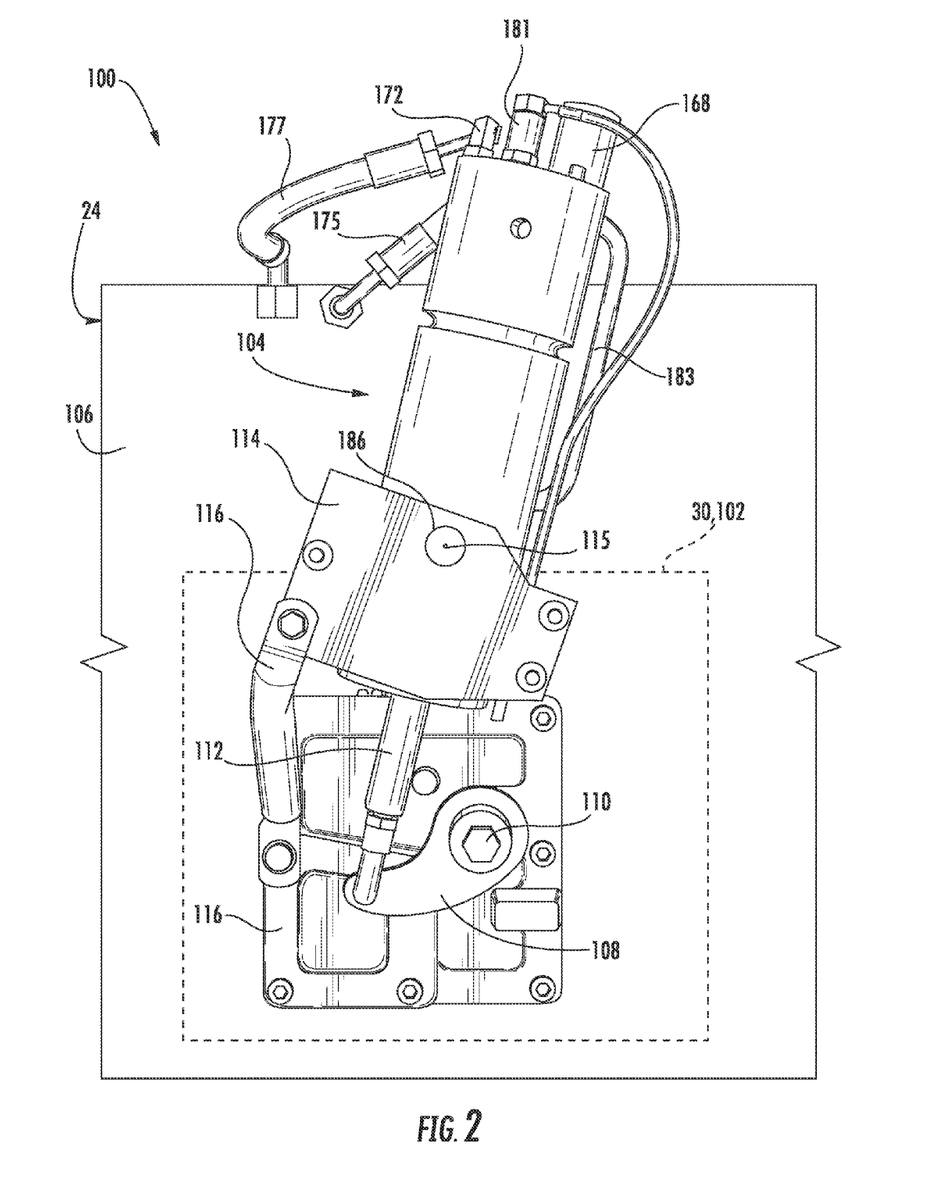
FIG. 2 illustrates a side view of one embodiment of a parking brake system suitable for use with a transmission of the work vehicle shown in FIG. 1, particularly illustrating a brake actuator of the system mounted to the exterior of the transmission.

Referring now to FIG. 2, a side view of one embodiment of a parking brake system 100 suitable for use with a transmission 24 of a work vehicle 10 is illustrated in accordance with aspects of the present subject matter. To simplify the illustration, only a partial, schematic view of the transmission 24 (indicated simply by the rectangular box) has been shown in FIG. 2. One of ordinary skill in the art should readily appreciate that the disclosed system 100 may generally be configured for use with any suitable transmission 24 that utilizes a parking brake 30, including power shift transmissions and continuously variable transmissions.

As shown in FIG. 2, the system 100 may include a braking mechanism 102 and a brake actuator 104 coupled to the braking mechanism 102. In general, the braking mechanism 102 may be configured to serve as the parking brake 30 for the work vehicle 10. Thus, in several embodiments, the braking mechanism 102 may be housed within the interior of the transmission 24 (as indicated by the dashed box) and may be configured to prevent rotational output of the transmission 24 when the braking mechanism 102 is engaged, such as when the work vehicle 10 is placed in park.

It should be appreciated that the braking mechanism 102 may generally have any suitable configuration that allows it to function as the vehicle's parking brake 30. For example, in several embodiments, the braking mechanism 102 may correspond to a brake clutch configured in operative association with an output shaft (not shown) of the transmission 24. In such embodiments, the braking mechanism 102 may include one or more clutch plates that, when actuated, engage corresponding clutch components coupled to the output shaft so as to prevent rotation of the output shaft. However, in other embodiments, braking mechanism 102 may have any other suitable parking brake configuration known in the art.

As shown in FIG. 2, unlike the braking mechanism 102, the brake actuator 104 of the disclosed system 100 may be configured to be positioned outside the transmission 24, such as by coupling the brake actuator 104 to the exterior of the transmission housing 106. In general, the brake actuator 104 may be configured to actuate the braking mechanism 102 between an engaged state (e.g., when the vehicle 10 is desired to be in park) and a disengaged state (e.g., when the vehicle 10 is desired to be driven). Specifically, in several embodiments, the brake actuator 104 may be configured to be coupled to a lever arm 108 positioned outside of the transmission 24, which may, in turn, be rotatably coupled to the braking mechanism 104 via a shaft 110 extending through the transmission housing 106 from the exterior to the interior of the transmission 24. As such, by linearly actuating a piston rod 112 associated with the brake actuator 104 (e.g., by extending or retracting the piston rod 122), the lever arm 108 and corresponding shaft 110 may be rotated clockwise or counterclockwise, thereby allowing for the braking mechanism 102 to be moved to either its engaged state or its disengaged state.

It should be appreciated that the brake actuator 104 may be configured to be coupled to the exterior of the transmission using any suitable attachment means and/or mechanism known in the art. For instance, as shown in FIG. 2, the brake actuator 104 may be supported along the exterior of the transmission 24 via a mounting bracket 114 configured to be coupled to the transmission housing 106. In several embodiments, the mounting bracket 114 may be box-shaped or may otherwise define a hollow tube or opening through which the actuator 104 may at least partially extend. In such embodiments, as will be described below, the brake actuator 104 may be configured to be pivotally coupled to the mounting bracket 114 so as to allow the actuator 104 to pivot relative to the bracket 114 about a fixed pivot point 115. Moreover, as shown in FIG. 2, one or more secondary support brackets or tubes 116 may be coupled between the mounting bracket 114 and the exterior of the transmission 24 to provide additional support for the brake actuator 104.

Figure 3:
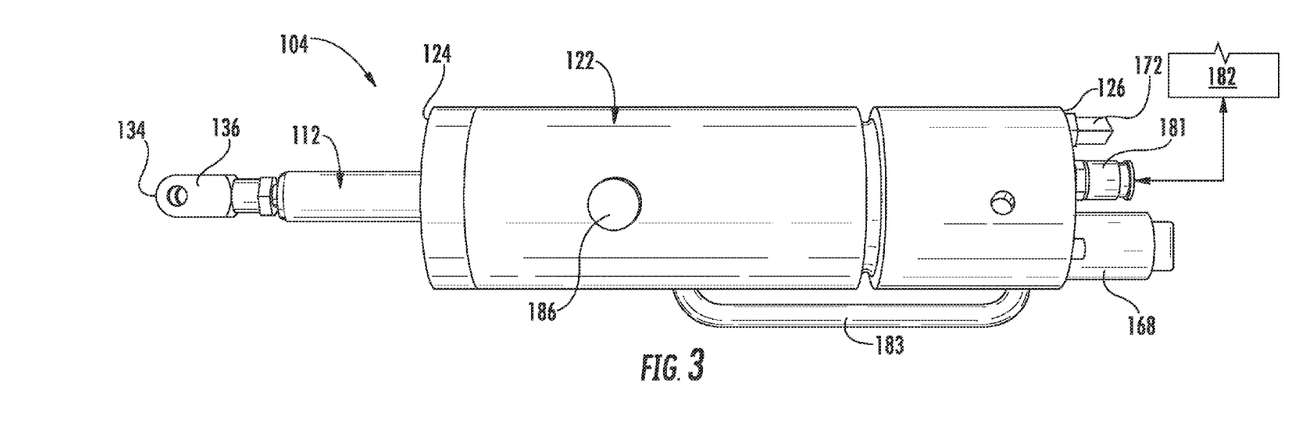
FIG. 3 illustrates a first side view of the brake actuator shown in FIG. 2.
Figure 4:
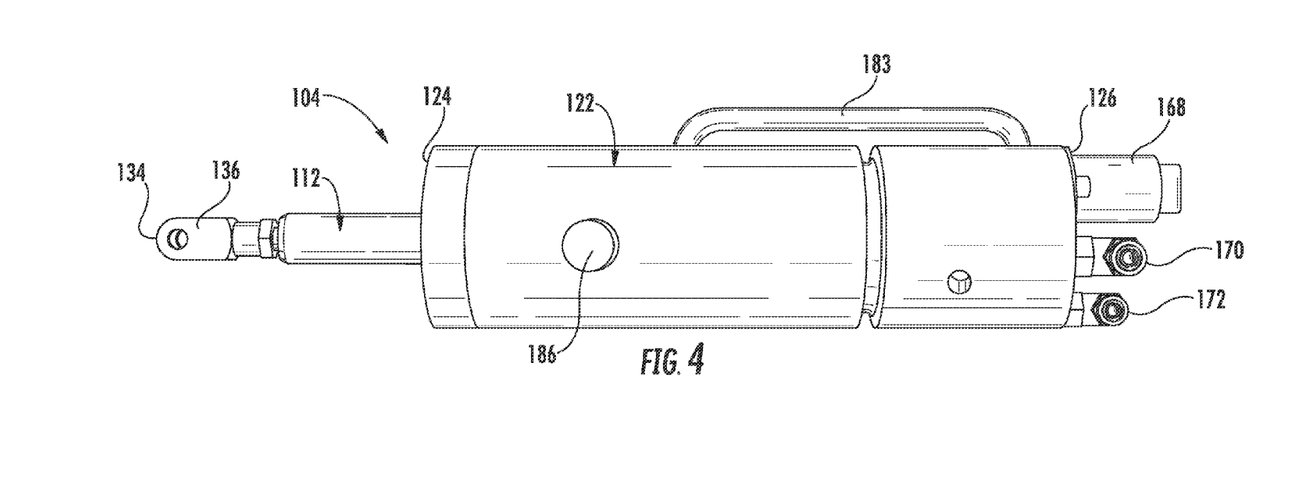
FIG. 4 illustrates a second side view of the brake actuator shown in FIG. 2, particularly illustrating an opposite side of the actuator shown in FIG. 3.
Figure 5:
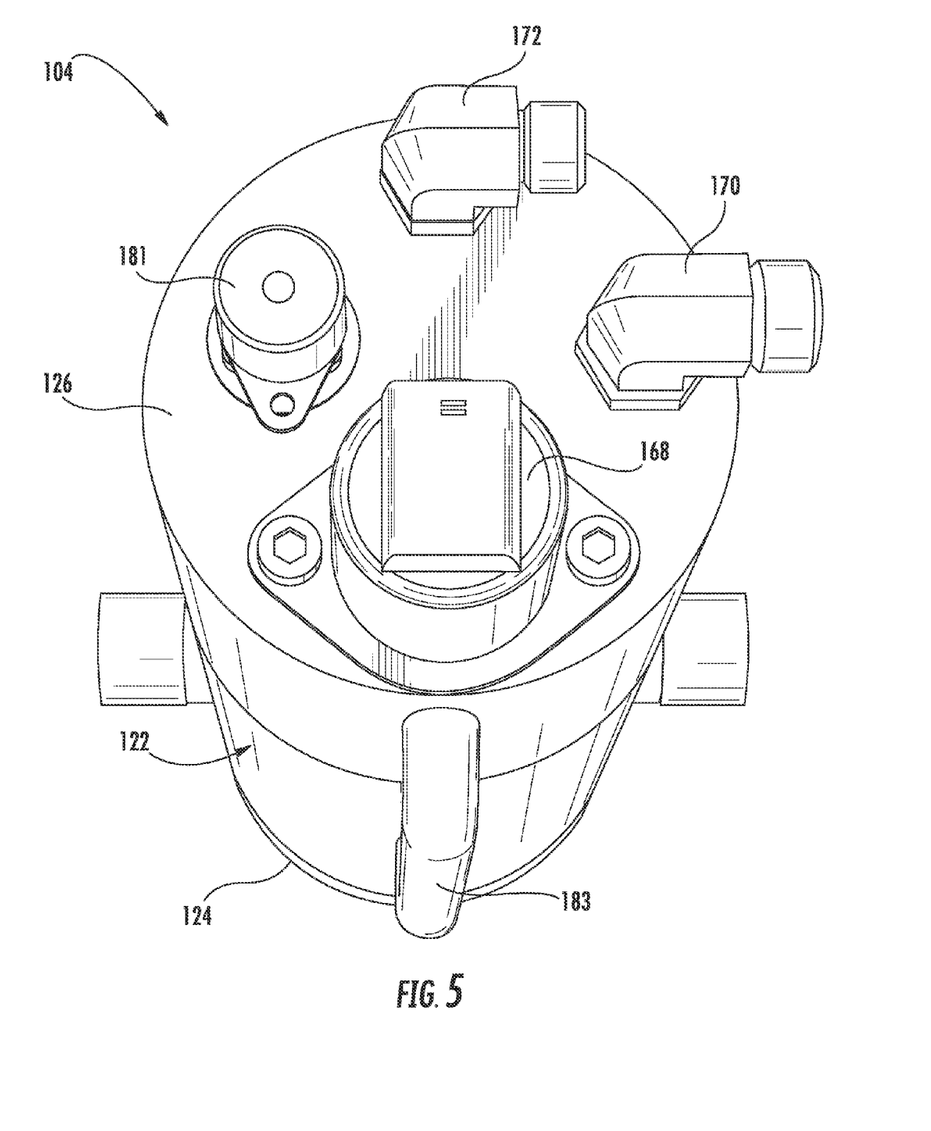
FIG. 5 illustrates a perspective view of one of the ends of the brake actuator shown in FIGS. 3 and 4.
Figure 6:
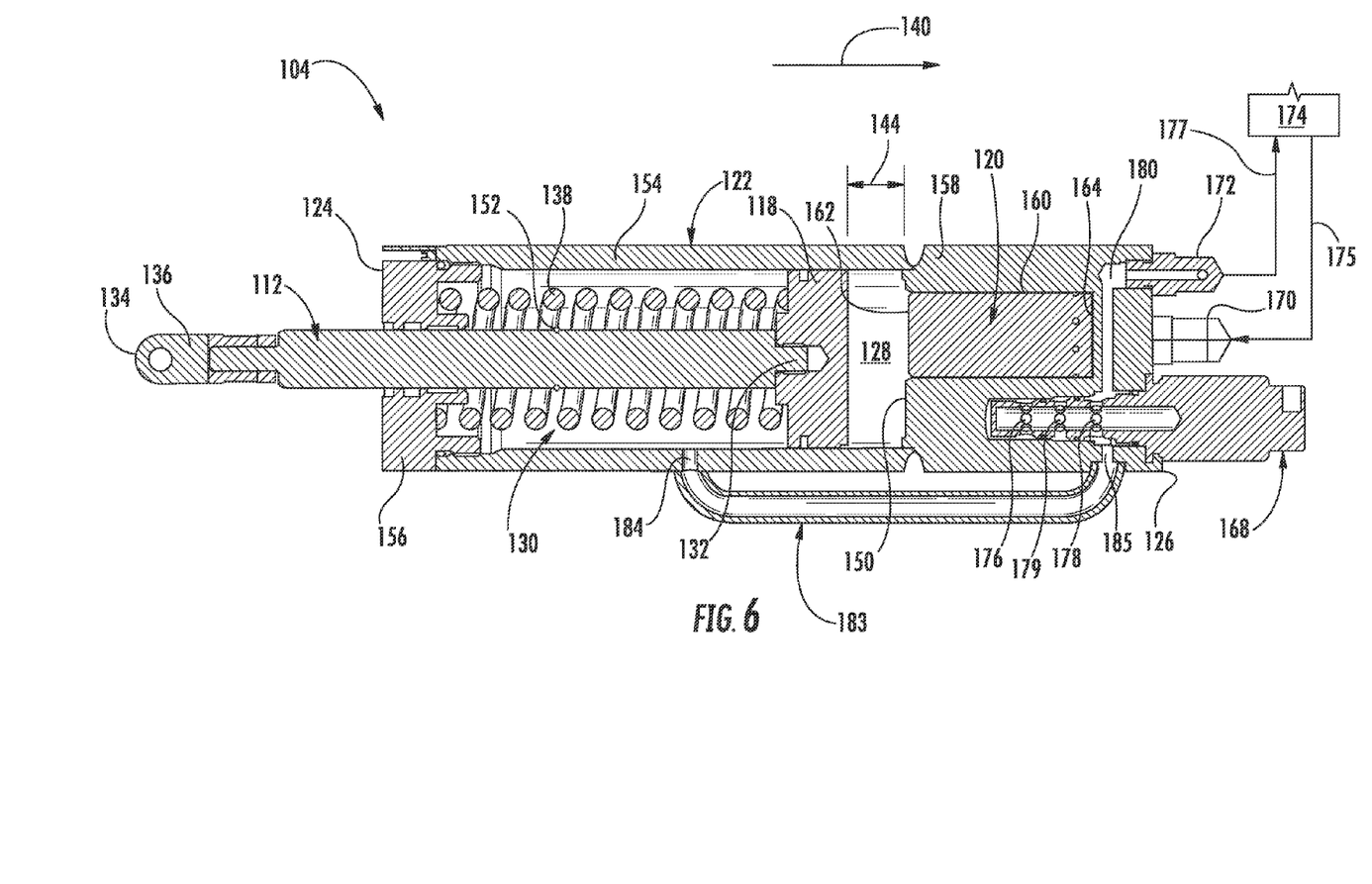
FIG. 6 illustrates a cross-sectional view of the brake actuator shown in FIGS. 3 and 4, particularly illustrating a primary piston of the actuator moved to a first position in order to engage an associated braking mechanism of the disclosed system.
Figure 7:
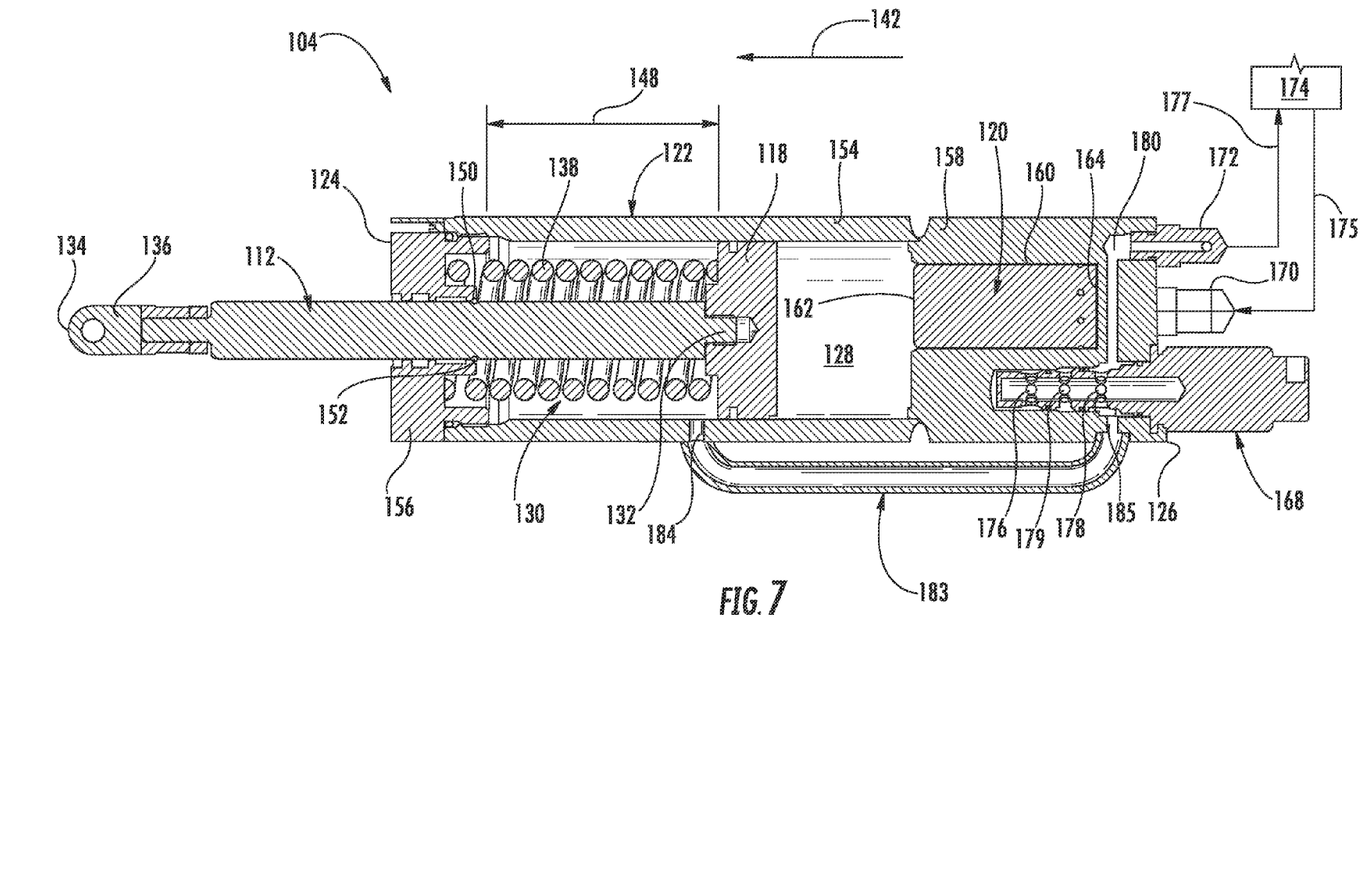
FIG. 7 illustrates another cross-sectional view of the brake actuator shown in FIGS. 3 and 4, particularly illustrating the primary piston moved to a second position in order to disengage the braking mechanism.
Figure 8:
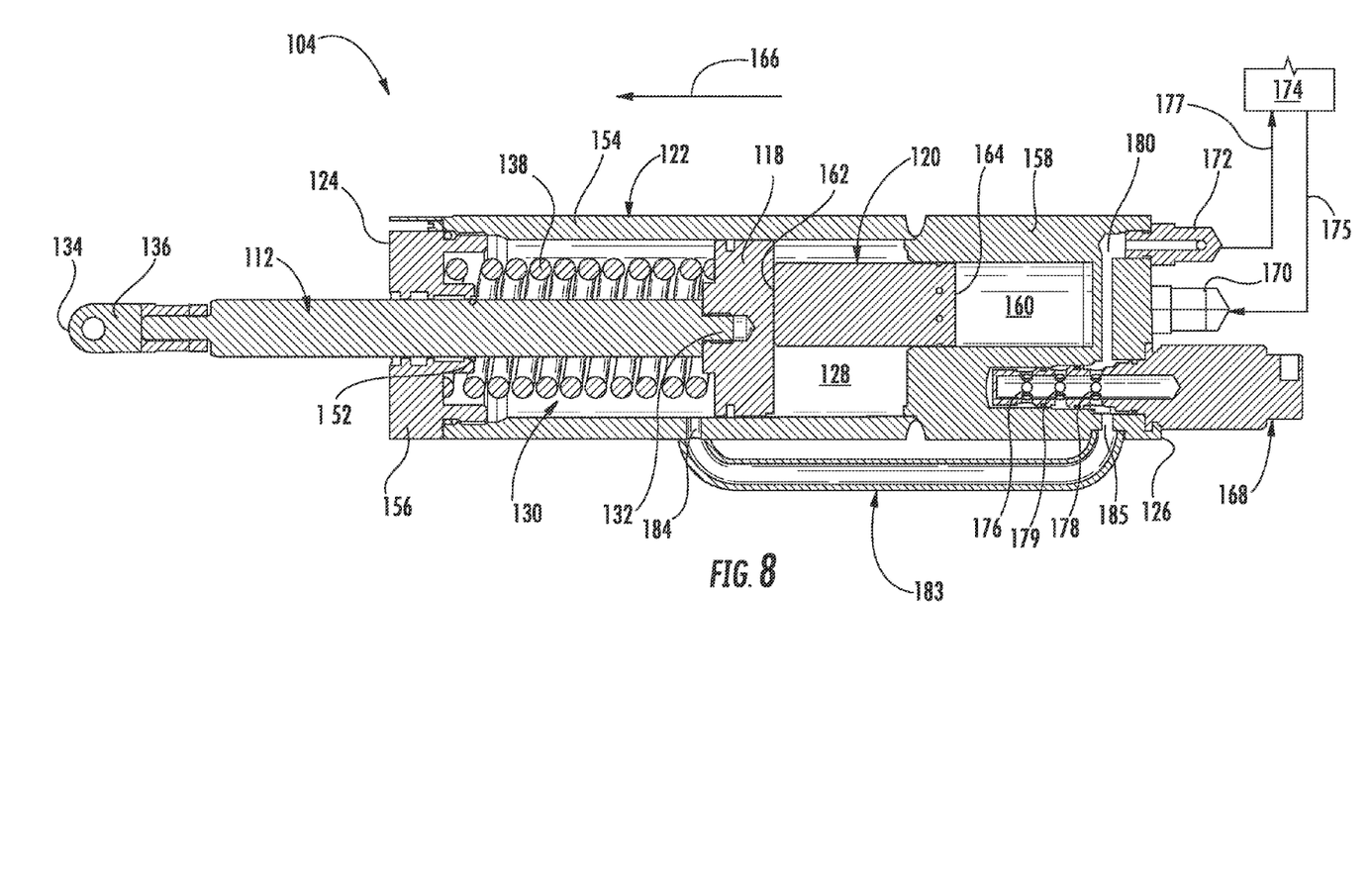
FIG. 8 illustrates a further cross-sectional view of the brake actuator shown in FIGS. 3 and 4, particularly illustrating a secondary piston of the actuator being moved outwardly so as to engage the primary piston in a manner that pushes the primary piston to the second position in order to disengage the braking mechanism.

Referring now to FIGS. 3-8, several views of one embodiment of a brake actuator 104 suitable for use within the disclosed parking brake system 100 are illustrated in accordance with aspects of the present subject matter. Specifically, FIG. 3 illustrates a first side view of the brake actuator 104 and FIG. 4 illustrates a second side view showing the opposite side of the brake actuator 104. FIG. 5 illustrates a top perspective view of one of the ends of the brake actuator 104. FIGS. 6 and 7 illustrate cross-sectional views of the brake actuator 104, with FIG. 6 illustrating a primary piston 118 of the brake actuator 104 moved to a first, engaged position and FIG. 7 illustrating the primary piston 118 moved to a second, disengaged position. Additionally, FIG. 8 illustrates another cross-sectional view of the brake actuator 104, particularly illustrating a secondary piston 120 of the brake actuator 104 engaging the primary piston 118 so as to move the piston 118 to its second, disengaged position.

In several embodiments, the brake actuator 104 may be configured as a spring-applied, hydraulic-release cylinder. Thus, as shown in FIGS. 3-8, the brake actuator 104 may generally include a cylindrical outer shell or housing 122 extending lengthwise between a first end 124 and a second end 126. As particularly shown in FIGS. 6-8, the housing 122 may define two primary internal chambers, namely a piston-side chamber 128 and a rod-side chamber 130. In addition, the brake actuator 104 may include a piston 118 disposed within the housing 122 between the piston-side and rod-side chambers 128, 130 and a piston rod 112 coupled to and extending outwardly from the piston 118. For instance, as shown in FIGS. 6-8, the piston rod 112 may extend from an interior end 132 coupled to the piston 118 through the rod-side chamber 130 to an exterior end 134 positioned outside the housing 122. In such an embodiment, the exterior end 134 of the piston rod 112 may include or be coupled to a suitable attachment mechanism 136 (e.g. a clevis fastener) configured to allow the piston rod 112 to be coupled to the lever arm 108 of the disclosed system 100. Moreover, as shown in FIGS. 6-8, the brake actuator 104 may also include a spring 138 positioned within the rod-side chamber 130 so as to be engaged between the piston 118 and the first end 124 of the housing 122.

During normal operation of the brake actuator 104 (e.g., when the actuator 104 is being operated in a normal or first operating mode), the piston 118 may generally be configured to be moved between a first position (FIG. 6) and a second position (FIG. 7). Specifically, in the absence of pressurized fluid within the piston-side chamber 128, the spring 138 may generally be configured to apply a biasing force against the piston 118 (e.g., in the direction of arrow 140 shown in FIG. 6) that tends to push the piston 118 in the direction of the second end 126 of the housing 122, thereby retracting the piston rod 112 and causing the lever arm 108 to be rotated in the clockwise direction so as to move the braking mechanism 102 to its engaged state. However, by supplying pressurized fluid to the piston-side chamber 128, the pressurized fluid may overcome the biasing force applied by the spring 138 and push the piston 118 in the direction of the first end 124 of the housing 122 (e.g., in the direction of arrow 142 shown in FIG. 7), which results in compression of the spring 138 and extension of the piston rod 112 outwardly from the housing 122. Such extension of the piston rod 112 causes the lever arm 108 to rotate in the counterclockwise direction, thereby moving the braking mechanism 102 to its disengaged state.

It should be appreciated that, for purposes of illustration, the piston 118 is shown in FIG. 6 as being spaced apart a distance 144 from an endwall 146 of the piston-side chamber 128 when the piston 118 is moved to its first position. However, in other embodiments, the piston 118 may be positioned closer to or further away from the endwall 146 of the piston-side chamber 128 when in the first position, including being positioned directly adjacent to the endwall 128 when moved to the first position. Additionally, as provided in FIG. 7, the piston 118 is shown as being spaced apart a distance 148 from an endwall 150 of the rod-side chamber 130 when the piston 118 is moved to its second position. In the illustrated embodiment, such spacing is due to the positioning of an annular flange 152 extending around the outer circumference of the piston rod 112 that engages the endwall 150 and serves as a mechanical stop for the piston/piston rod 118, 112. However, in other embodiments, the annular flange 152 may be positioned at any other suitable location along the length of the piston rod 112. Alternatively, the annular flange 152 may be completely removed from the piston rod 112 so that no mechanical stop is provided for the piston/piston rod 118, 112.

It should also be appreciated that, in several embodiments, the housing 122 may be formed from two or more housing components configured to be assembled together to form a complete housing assembly For instance, as shown in the illustrated embodiment, the housing 122 includes a central housing component 154, a first side housing component 156 extending from the central housing component 154 to the first end 124 of the housing 122 and a second side housing component 158 extending from the central housing component 154 to the second end 126 of the housing 122. However, in other embodiments, the housing 122 may be formed from any other number of housing components, such as a single housing component, two housing components or four or more housing components.

Additionally, in accordance with aspects of the present subject matter, the housing 122 may also define a secondary chamber 160 configured to receive a secondary piston 120 of the brake actuator 104. Specifically, as shown in FIGS. 6-8, the secondary chamber 160 may be defined within the housing 122 between the piston-side chamber 128 and the second end 126 of the housing 112. The secondary piston 120 may generally be configured to be at least partially received within the secondary chamber 160. For instance, as shown in FIGS. 6-8, the secondary piston 120 may be configured to extend lengthwise within the secondary chamber 160 between a proximal end 162 positioned at or adjacent to the primary piston 118 and a distal end 164 positioned opposite the proximal end 162.

In several embodiments, the secondary piston 120 may be configured to disengage the braking mechanism 102 when the work vehicle 10 is disabled and/or when the brake actuator 104 is otherwise unable to actuate the primary piston 118 within its normal operating mode. Specifically, as shown in FIGS. 6 and 7, when the brake actuator 104 is being operated in its normal or first operating mode, the secondary piston 120 may be located in an unactuated position within the secondary chamber 160. However, by supplying pressurized fluid within the secondary chamber 160 at the distal end 164 of the secondary piston 120, the secondary piston 120 may be actuated outwardly from the secondary chamber 160 towards the first end 124 of the housing 122. For example, as shown in FIG. 8, when actuated, the proximal end 162 of the secondary piston 120 may contact and apply a force against the primary piston 118 (e.g., in the direction of arrow 166) that moves the piston 118 from its first position to its second position, thereby disengaging the braking mechanism 102. Thereafter, to re-engage the braking mechanism 102, the pressurized fluid may be removed from the secondary chamber 160 such that the biasing force applied by the spring 138 pushes the primary piston 118 back to its first position, which, in turn, pushes the secondary piston 120 back within the secondary chamber 160 to its unactuated position. Such actuation and refraction of the secondary piston 120 may generally allow for the brake actuator 108 to be operated in a separate, secondary operating mode for disengaging and subsequently re-engaging the braking mechanism 102.

Referring still to FIGS. 3-8, the brake actuator 104 may also include a valve 168 and one or more fluid ports defined within and/or through the housing 122 for supplying fluid into and/or expelling fluid from the housing 122. Specifically, in several embodiments, the brake actuator 104 may include both a supply port 170 and a return port 172 located at or adjacent to the second end 126 of the housing 122 for supplying fluid to and expelling fluid from the piston-side chamber 128, respectively. For example, the supply port 170 may be coupled to a suitable fluid source 172 of the work vehicle 10 (e.g., the vehicle's hydraulic tank) via a fluid coupling 175 (FIG. 2) to allow fluid to be directed into the housing 122 and supplied to one or more corresponding valve supply ports 176 of the associated valve 168 via an internal flow path (not shown) defined within the actuator 104. Similarly, the return port 172 may be coupled to the fluid source 174 via a separate fluid coupling 177 (FIG. 2) to allow fluid expelled from the piston-side chamber 128 to be directed from one or more corresponding valve return ports 178 of the valve 168 to the return port 172 via an internal flow path 180 defined within the actuator 104 and then subsequently be delivered back to the fluid source 174. In such an embodiment, the valve 168 may also include one or more working or control ports 179 in flow communication with the piston-side chamber 128 (e.g., via an internal flow path (not shown)) that, depending on the operating state of the valve 128, provides for a fluid connection between the valve 128 and either the supply port 170 or return port 172. For example, to supply fluid to the piston-side chamber 128, the valve 168 may be actuated such that the valve supply port(s) 176 is in flow communication with the control port(s) 179. As such, fluid supplied into the housing 122 via the supply port 170 may flow from the valve support port(s) 176 to the control port(s) 179 and may then be supplied into the piston-side chamber 128. Similarly, to expel fluid from the piston-side chamber 128, the valve 168 may be actuated such that the valve return port(s) 178 is in flow communication with the control port(s) 179. In such instance, fluid contained within the piston-side chamber 128 may be directed from the control port(s) 179 to the valve return port(s) 178 and subsequently expelled from the housing 122 via the return port 172.

It should be appreciated that, in general, the valve 168 may correspond to any suitable valve type and may have any suitable valve configuration that allows it to function as described herein. For example, in several embodiments, the valve 168 may correspond to an electronically controlled, pressure reducing proportional valve configured to be integrated within and/or otherwise coupled to the brake actuator 104, such as by configuring the valve 168 to be mounted to the second end 126 of the housing 122 so that a portion of the valve 168 extends within the housing 122. However, in other embodiments, the valve 168 may correspond to any other suitable valve type and/or may be positioned at any other suitable location relative to the housing 122.

It should also be appreciated that, in addition to providing for a selective fluid connection between the piston-side chamber 128 and either the supply port 170 or the return port 172, the valve 168 may also be configured to regulate the pressure of the fluid supplied to the piston-side chamber 128. For example, the position of a poppet or actuator (not shown) of the valve 168 relative to the control port(s) 179 may be carefully controlled in order to increase or decrease the pressure of the fluid supplied to the piston-side chamber 128.

In addition to the supply and return ports 170, 172, the brake actuator 104 may also include a secondary port 181 in flow communication with the secondary chamber 160 via an internal flow path (not shown) defined within the actuator 104. For example, as shown in FIG. 3, the secondary port 181 may be positioned at or adjacent to the second end 126 of the housing 122 so as to provide a fluid connection between the secondary chamber 160 and a suitable fluid source 182 (F (e.g., a fluid tank and/or any other suitable fluid source, such as a grease gun). In such an embodiment, fluid may be pumped into the secondary chamber 160 via the secondary port 181 in order to actuate the secondary piston 120, thereby pushing the primary piston 118 to its second position and subsequently disengaging the braking mechanism 102. Similarly, fluid may be pumped out of the secondary chamber 160 via the secondary port 181 in order to remove the fluid pressure from within the chamber 160, thereby allowing the primary piston 118 to return to its first portion and subsequently re-engaging the braking mechanism 102.

As shown in FIGS. 6-8, in several embodiments, the secondary port 181 may be configured to be coupled to a fluid source 182 that differs from the fluid source 174 associated with the supply and return ports 170, 172. For instance, in one embodiment, the supply and return ports 170, 172 may both be fluidly coupled to the hydraulic tank of the work vehicle 10 whereas the secondary port 181 may be configured to be fluidly coupled to a temporary or removable fluid source 182, such as a manually operated grease gun. In such instance, when it is desired to disengage the braking mechanism 102 using the secondary piston 120, the temporary or removable fluid source 182 may be connected to the secondary port 181 (e.g., via a suitable fluid coupling) to allow fluid to be supplied into the secondary chamber 160. Alternatively, the secondary port 181 may be configured to be coupled to the same fluid source as the supply and return ports 170, 172, such as by coupling all three ports 170, 172, 181 to the vehicle's hydraulic tank.

It should also be appreciated that, in several embodiments, the same or a different type of fluid may be supplied to each of the various ports 170, 172, 181 of the brake actuator 104. For instance, in one embodiment, a conventional hydraulic fluid may be directed through the supply and return ports 170, 172 whereas grease or any other suitable fluid may be directed through the secondary port 181.

Additionally, as shown in the illustrated embodiment, the brake actuator 104 may also include a fluid vent 183 fluidly connected between the rod-side chamber 130 and the return port 172 for expelling any fluid contained within the rod-side chamber 130. Specifically, as shown in FIGS. 6-8, the fluid vent 183 may define a fluid path extending between a first end 184 in flow communication with the rod-side chamber 130 and a second end 185 in flow communication with the return port 172 (e.g., via the internal flow path 180 extending between the return port 172 and the valve return port(s) 178). As such, in the event that any fluid has accumulated within the rod-side chamber 130 (e.g., due to the leakage of fluid around the outer circumference of the primary piston 118), such fluid may be evacuated from the rod-side chamber 130 via the fluid vent 183.

It should be appreciated that, by coupling the fluid vent 183 to the return port 172, the fluid contained in both the rod-side chamber 130 and the piston-side chamber 128 may be expelled from the brake actuator 104 via the same port. However, in other embodiments, the fluid vent 183 may be coupled between the piston-side chamber 130 and a separate port for expelling any fluid contained within the rod-side chamber 130 from the brake actuator 104.

Additionally, it should be appreciated that, although the fluid vent 183 is shown in the illustrated embodiment as providing a flow path between the rod-side chamber 130 and the valve 168 that extends exterior to the housing 122, the fluid vent 183 may, instead, be integrated within the housing 122. For instance, in an alternative embodiment, the fluid vent 183 may correspond to a passageway defined within a wall of the housing 122 so that the flow path formed entirely within the housing 122.

As indicated above, in several embodiments, the brake actuator 104 may be configured to be mounted to the transmission 24 via a mounting bracket(s) 114. In such embodiments, the brake actuator 104 may also include suitable pivotal attachment features for allowing the actuator 104 to be pivotally coupled to the mounting bracket(s) 114. For instance, as particularly shown in FIGS. 3 and 4, the brake actuator 104 may include one or more cylindrical trunnions or protrusions 186 extending outwardly from the housing 122. Such protrusion(s) 186 may, in turn, be configured to be received within a corresponding opening(s) (not shown) defined in the mounting bracket(s) 114 so as allow the brake actuator 104 to pivot relative to the mounting bracket(s) 114 about a fixed pivot point 115. As a result, when the lever arm 108 is rotated via extension or retraction of the piston rod 112, the brake actuator 104 may pivot relative to the mounting bracket(s) 114 (and relative to the transmission 24) in order to accommodate the lever arm motion.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A parking brake system for use with a transmission of a work vehicle, the parking brake system comprising:
    a braking mechanism housed within the transmission; and
    a brake actuator positioned outside the transmission, the brake actuator being coupled to the braking mechanism to allow the braking mechanism to be actuated between an engaged state and a disengaged state, the brake actuator comprising:
    a housing extending between a first end and a second end, the housing at least partially defining a rod-side chamber, a secondary chamber and a piston-side chamber extending between the rod-side and secondary chambers;
    a primary piston positioned within the housing between the piston-side and rod-side chambers, the primary piston movable between a first position at which the braking mechanism is actuated to the engaged state and a second position at which the braking mechanism is actuated to the disengaged state;

a rod extending partially within the rod-side chamber and including an internal end coupled to the primary piston and an external end positioned outside the housing;

a spring housed within the rod-side chamber so as to be engaged between the primary piston and the first end of the housing; and a secondary piston at least partially housed within the secondary chamber, the secondary piston extending between a proximal end positioned at or adjacent to the primary piston and a distal end positioned opposite the proximal end, the secondary piston being configured to apply a force against the primary piston when fluid is supplied within the secondary chamber at the distal end of the secondary piston in order to move the primary piston from the first position to the second position.

2. The parking brake system of claim 1, wherein the brake actuator is operable in both a first operating mode, within which the primary piston is configured to be moved from the first position to the second position by supplying fluid within the piston-side chamber in order to push the primary piston in the direction of the first end of the housing, and a second operating mode, within which the primary piston is configured to be moved from the first position to the second position by supplying fluid into the secondary chamber at the distal end of the secondary piston such that the proximal end of the secondary piston contacts against the primary piston in order to push the primary piston in the direction of the first end of the housing.

3. The parking brake system of claim 1, wherein the brake actuator further comprises a supply port for supplying fluid within the housing and a return port for expelling fluid from the housing.

4. The parking brake system of claim 3, wherein the brake actuator further comprises a valve in flow communication with the supply and return ports, the valve being configured to regulate the fluid supplied to and expelled from the piston-side chamber by selectively coupling the piston side chamber to either the supply port or the return port.

5. The parking brake system of claim 3, wherein the brake actuator further comprises a secondary port in fluid communication with the secondary chamber.

6. The parking brake system of claim 5, wherein the supply and return ports are fluidly connected to a first fluid source and the secondary port is configured to be fluidly connected to a separate, second fluid source.

7. The parking brake system of claim 1, wherein the brake actuator further comprises a return port for expelling fluid from the housing and a fluid vent in flow communication between the rod-side chamber and the return port, wherein fluid contained within the rod-side chamber is evacuated therefrom via the fluid vent and is expelled from the brake actuator through the return port.

8. The parking brake system of claim 7, wherein the return port is also in flow communication with the piston-side chamber such that fluid contained in both the piston-side chamber and the rod-side chamber is expelled from the brake actuator through the return port.

9. The parking brake system of claim 1, wherein the brake actuator is pivotally coupled to the transmission such that the brake actuator pivots about a fixed pivot point when the braking mechanism is actuated between the engaged and disengaged states.

10. A parking brake system for use with a transmission of a work vehicle, the parking brake system comprising:

a braking mechanism housed within the transmission; and a brake actuator positioned outside the transmission, the brake actuator being coupled to the braking mechanism to allow the braking mechanism to be actuated between an engaged state and a disengaged state, the brake actuator comprising:

a housing extending between a first end and a second end, the housing at least partially defining a rod-side chamber and a piston-side chamber;

a primary piston positioned within the housing between the piston-side and rod-side chambers, the primary piston movable between a first position at which the braking mechanism is actuated to the engaged state and a second position at which the braking mechanism is actuated to the disengaged state;

a rod extending partially within the rod-side chamber and including an internal end coupled to the primary piston and an external end positioned outside the housing;

a spring housed within the rod-side chamber so as to be engaged between the primary piston and the first end of the housing;

a return port defined within or extending from the housing; and a fluid vent in flow communication between the rod-side chamber and the return port, wherein any fluid contained within the rod-side chamber is evacuated therefrom via the fluid vent and is subsequently expelled from the brake actuator through the return port.

11. The parking brake system of claim 10, wherein the return port is also in flow communication with the piston-side chamber such that fluid contained in both the piston-side chamber and the rod-side chamber is expelled from the brake actuator through the return port.

12. The parking brake system of claim 10, wherein the housing further defines a secondary chamber extending between the piston-side chamber and the second end of the housing and wherein the brake actuator further comprises a secondary piston at least partially housed within the secondary chamber.

13. The parking brake system of claim 12, wherein the secondary piston extends between a proximal end positioned at or adjacent to the primary piston and a distal end positioned opposite the proximal end, the secondary piston being configured to apply a force against the primary piston when fluid is supplied within the secondary chamber at the distal end of the secondary piston in order to move the primary piston from the first position to the second position.

14. The parking brake system of claim 13, wherein the brake actuator is operable in both a first operating mode, within which the primary piston is configured to be moved from the first position to the second position by supplying fluid within the piston-side chamber in order to push the primary piston in the direction of the first end of the housing, and a second operating mode, within which the primary piston is configured to be moved from the first position to the second position by supplying fluid into the secondary chamber at the distal end of the secondary piston such that the proximal end of the secondary piston contacts against the primary piston in order to push the primary piston in the direction of the first end of the housing.

15. The parking brake system of claim 12, wherein the brake actuator further comprises a supply port defined within or extending from the housing and a valve in flow communication with the supply and return ports, the valve being configured to regulate the fluid supplied to and expelled from the piston-side chamber by selectively coupling the piston side chamber to either the supply port or the return port.

16. The parking brake system of claim 15, wherein the brake actuator further comprises a secondary port defined within or extending from the housing, the secondary port being in fluid communication with the secondary chamber.

17. The parking brake system of claim 16, wherein the supply and return ports are fluidly connected to a first fluid source and the secondary port is configured to be fluidly connected to a separate, second fluid source.

18. The parking brake system of claim 10, wherein the brake actuator is pivotally coupled to the transmission such that the brake actuator pivots about a fixed pivot point when the braking mechanism is actuated between the engaged and disengaged states.

* * * * *